US009928615B2

(12) United States Patent
Cai et al.

(10) Patent No.: US 9,928,615 B2
(45) Date of Patent: Mar. 27, 2018

(54) METHOD AND APPARATUS FOR REPETITIVE STRUCTURE DISCOVERY BASED 3D MODEL COMPRESSION

(71) Applicant: THOMSON LICENSING, Issy de Moulineaux (FR)

(72) Inventors: Kangying Cai, Beijing (CN); Wenfei Jiang, Beijing (CN); Jiang Tian, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 94 days.

(21) Appl. No.: 14/391,563

(22) PCT Filed: Dec. 29, 2012

(86) PCT No.: PCT/CN2012/087937
§ 371 (c)(1),
(2) Date: Oct. 9, 2014

(87) PCT Pub. No.: WO2013/155859
PCT Pub. Date: Oct. 24, 2013

(65) Prior Publication Data
US 2015/0084954 A1    Mar. 26, 2015

(30) Foreign Application Priority Data

Apr. 19, 2012    (WO) ................ PCT/CN2012/074388

(51) Int. Cl.
*G06T 9/00*    (2006.01)
*G06T 15/00*   (2011.01)
(Continued)

(52) U.S. Cl.
CPC .............. *G06T 9/001* (2013.01); *G06T 15/00* (2013.01); *H04N 19/124* (2014.11); *H04N 19/18* (2014.11); *H04N 19/136* (2014.11)

(58) Field of Classification Search
None
See application file for complete search history.

(56) References Cited

U.S. PATENT DOCUMENTS 6,438,266 B1    8/2002  Bajaj et al.
7,184,071 B2    2/2007  Chellappa et al.
(Continued)

FOREIGN PATENT DOCUMENTS

CN          101795407          8/2010
CN     WO 2010142743 A2 *  12/2010  ............. G06T 9/001
(Continued)

OTHER PUBLICATIONS

Cai, Kangying, et al. "Exploiting repeated patterns for efficient compression of massive models." Proceedings of the 8th International Conference on Virtual Reality Continuum and its Applications in Industry. ACM, 2009.*
(Continued)

*Primary Examiner* — Yi Wang
(74) *Attorney, Agent, or Firm* — Tutunjian & Bitetto, P.C.

(57) ABSTRACT

A 3D model can be modeled using "pattern-instance" representation, wherein an instance component may be represented as transformation (for example, rotation, translation, and scaling) of a pattern. To improve compression efficiency, the quantization parameters for the rotation part and translation part for transformation of an instance can be determined based on the quantization parameter used for encoding a corresponding pattern. Specifically, the quantization parameter for the rotation part may depend on the size of the instance, and the quantization parameter for the translation part may depend on the scale of translation. That is, a larger instance may use a finer quantization parameter for the rotation part. The quantization parameters are so determined that quantization errors caused by compressing the patterns,
(Continued)

the translation part of transformation, and the rotation part of transformation are at similar levels.

6 Claims, 7 Drawing Sheets

(51) Int. Cl.
*H04N 19/124* (2014.01)
*H04N 19/18* (2014.01)
*H04N 19/136* (2014.01)

(56) References Cited

U.S. PATENT DOCUMENTS

| | | | | |
|---|---|---|---|---|
| 2002/0004710 A1* | 1/2002 | Murao | ............... | G06T 17/005 702/167 |
| 2009/0080516 A1* | 3/2009 | Chang | ............... | G06T 9/001 375/240.03 |
| 2010/0194610 A1 | 8/2010 | Chen et al. | | |
| 2012/0106858 A1 | 5/2012 | Cai et al. | | |

FOREIGN PATENT DOCUMENTS

| | | | | |
|---|---|---|---|---|
| CN | WO 2010149492 A1 * | 12/2010 | ............... | G06T 9/001 |
| JP | 2000-334167 | 12/2000 | | |
| JP | 2012-530990 | 12/2012 | | |
| KR | 20050006322 A | 1/2005 | | |
| WO | WO98/58350 | 12/1998 | | |
| WO | WO2006/075895 A1 | 7/2006 | | |
| WO | WO2009/128660 A2 | 10/2009 | | |
| WO | WO2010/149492 A1 | 12/2010 | | |

OTHER PUBLICATIONS

Sorkine et al., "High-Pass Quantization for Mesh Encoding," Eurographics Symposium on Geometry Processing, 2003, 11 pages.
Choi et al., "Geometry Compression of 3-D Mesh Models Using Predictive Two-Stage Quantization," IEEE Transactions on Circuits and Systems for Video Technology, vol. 10, No. 2, Mar. 2000, pp. 312-322.
Machizawa, "Offset Adjustment to Reduce Coding Error of Interpolative DPCM," Systems and Computers in Japan, vol. 27, No. 4, 1996, pp. 75-82.
Cai et al: "Exploiting repeated patterns for efficient compression of massive models", Proceedings VRCAI. ACM Siggraph International Conference on Virtual Reality Continuum and its Applications in Industry, No. 8th, Dec. 14, 2009, pp. 145-150.
Cai et al: "Bitstream specification for repetitive features detection in 3D mesh coding", 99th MPEG Meeting Feb. 6-10, 2012, San Jose; (Motion Picture Expert Group or ISO/IEC JTC1/SC29/WG11), No. m23570, Jan. 27, 2012, 6 pages.
Jiang et al: "PB3DMC Quality Control", 100th MPEG Meeting Apr. 30-May 4, 2012, Geneva; (Motion Picture Expert Group or ISO/IEC JTC1/SC29/WG11), No. m24743, Apr. 20, 2012, 4 pages.

\* cited by examiner

METHOD AND APPARATUS FOR REPETITIVE STRUCTURE DISCOVERY BASED 3D MODEL COMPRESSION

CROSS-REFERENCE TO RELATED APPLICATIONS

This application claims the benefit, under 35 U.S.C. § 365 of International Application PCT/CN2012/087937, and filed Dec. 29, 2012, which was published in accordance with PCT Article 21(2) on Oct. 24, 2013, in English, and which claims the benefit of International Application PCT/CN2012/074388, filed Apr. 19, 2012, in English, which are incorporated by reference in their respective entireties.

TECHNICAL FIELD

This invention relates to a method and apparatus for generating a bitstream representative of a 3D model, and a method and apparatus for decoding the same.

BACKGROUND

In practical applications, many 3D models consist of a large number of connected components. These multi-component 3D models usually contain many repetitive structures in various transformations, as shown in FIG. 1.

Efficient compression algorithms for multi-component 3D models that take advantage of repetitive structures in input models are known. Repetitive structures of a 3D model are discovered in various positions, orientations, and scaling factors. The 3D model is then organized into "pattern-instance" representation. A pattern is used to denote a representative geometry of a corresponding repetitive structure. Components belonging to a repetitive structure are denoted as instances of the corresponding pattern and may be represented by a pattern ID and transformation information, for example, reflection, translation, rotation and possible scaling with respect to the pattern. The instance transformation information may be organized into, for example, reflection part, translation part, rotation part, and possible scaling part. There might be some components of the 3D models that are not repetitive, which are referred to as unique components.

A commonly owned PCT application, entitled "System and method for error controllable repetitive structure discovery based compression" by K. Cai, W. Jiang, and T. Luo (PCT/CN2012/070877), the teachings of which are specifically incorporated herein by reference, discloses a method and apparatus for identifying repetitive structures in 3D models to reduce redundancy among instance components, and thus to improve compression efficiency.

SUMMARY

The present principles provide a method for generating or decoding a bitstream representing a 3D model, comprising the steps of accessing a first quantization parameter used for encoding a pattern associated with the 3D model; determining a scale of an instance of the pattern and a scale of the pattern, the instance being represented as a transformation of the pattern; determining a second quantization parameter for a rotation part of the transformation for the instance in response to the first quantization parameter, the scale of the instance, and the scale of the pattern; and performing encoding or decoding of the rotation part of the transformation for the instance in response to the second quantization parameter as described below. The present principles also provide an apparatus for performing these steps.

The present principles also provide a computer readable storage medium having stored thereon instructions for generating or decoding a bitstream according to the methods described above.

The present principles also provide a computer readable storage medium having stored thereon a bitstream generated according to the methods described above.

DETAILED DESCRIPTION

Figure 1:
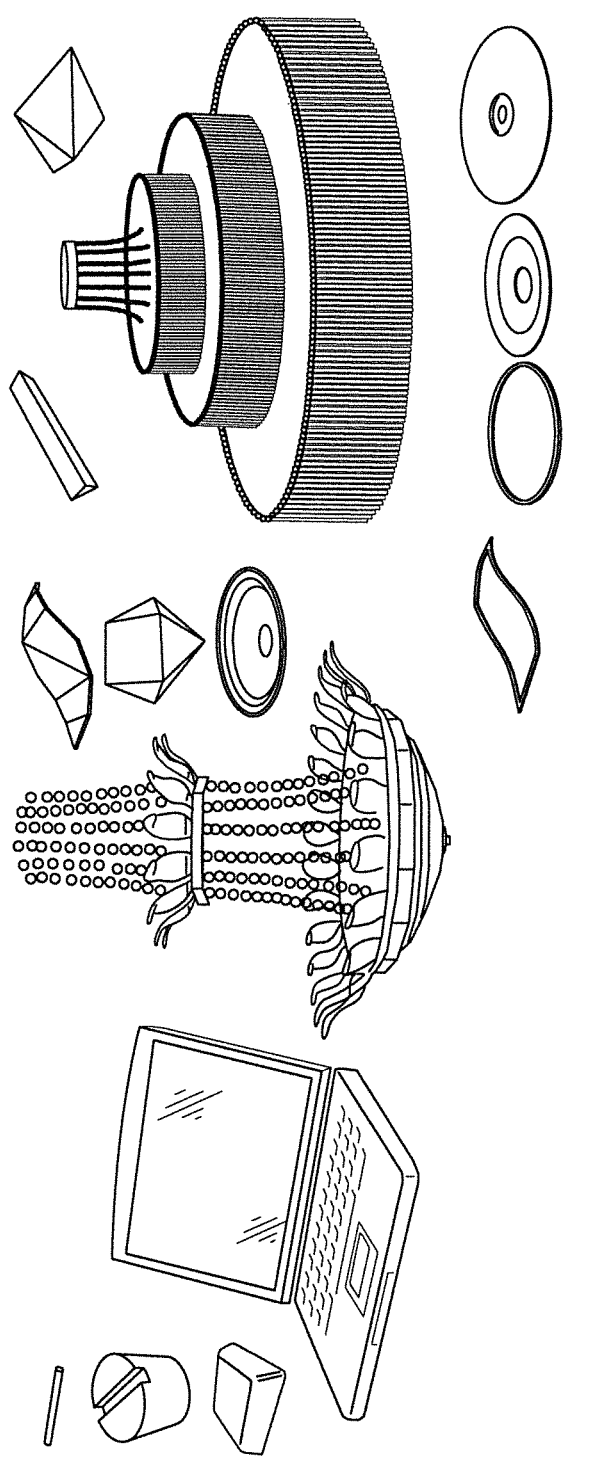
FIG. 1 shows exemplary 3D models with a large number of connected components and repetitive structures.

As shown in FIG. 1, there may be many repetitive structures in 3D models. To efficiently encode the 3D models, the repetitive structures may be organized into patterns and instances, wherein an instance can be represented as a transformation of a corresponding pattern, for example, using a pattern ID and a transformation matrix which contains information such as translation, rotation, and scaling.

When an instance is represented by a pattern ID and a transformation matrix, the pattern ID and the transformation matrix are to be compressed when compressing the instance. Consequently, an instance may be reconstructed through the pattern ID and the decoded transformation matrix, that is, an instance may be reconstructed as transformation (from the decoded transformation matrix) of a decoded pattern indexed by the pattern ID.

Figure 2A:
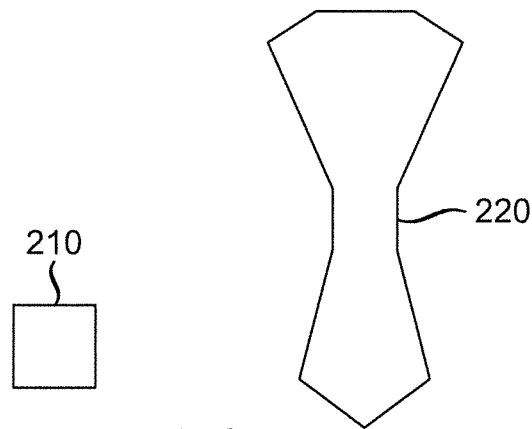
FIG. 2A shows pictorial examples depicting patterns.
Figure 2B:
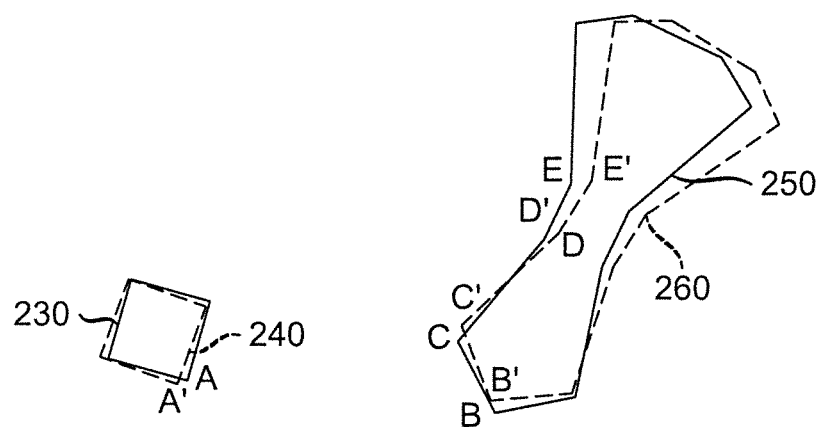
FIG. 2B shows pictorial examples depicting corresponding instances and reconstructed instances.

FIGS. 2A and 2B illustrate exemplary components in a 2D representation, wherein components 210 and 220 are patterns, components 230 and 250 (in solid lines) are original instances to be compressed, and components 240 and 260 (in dashed lines) are reconstructed instances. In particular, instances 230 and 250 can be represented as transformed (i.e., rotated and translated) versions of patterns 210 and 220, respectively. In FIG. 2B, between the original instance and the reconstructed instance, there are errors caused by both translation and rotation quantization. For illustration purposes, in FIG. 2C, we provide instances 270 and 280 with only rotation errors.

Figure 2C:
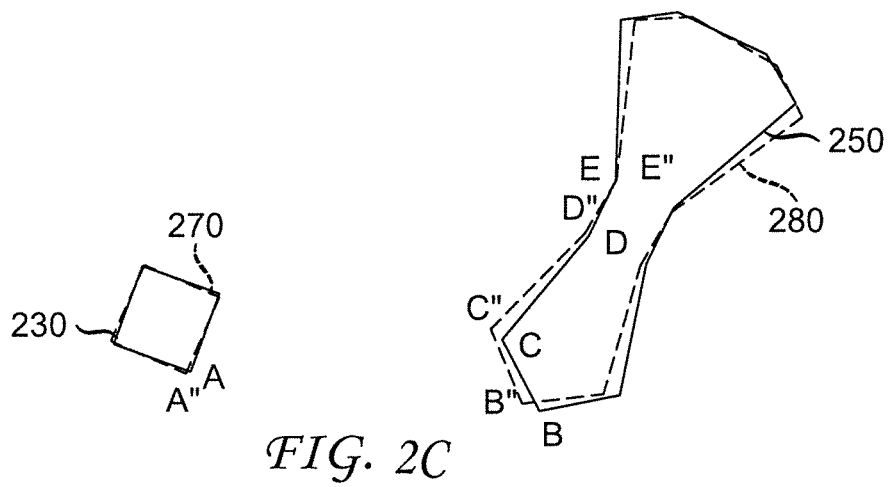
FIG. 2C shows pictorial examples depicting corresponding instances and instances with reconstruction errors of rotation parameters.

In the examples of FIG. 2C, quantization of rotation introduces an error of about 5°, causing differences between original instances and reconstructed instances. As can be seen in FIG. 2C, while the rotation errors (in angular measure) are similar for instances 230 and 250, the vertex coordinate errors (i.e., vertex shifts, for example, from A to A" and from B to B" in FIG. 2C, between original instances and reconstructed instances) caused by rotation quantization vary significantly between both instances, with instance 250 having much larger vertex coordinate errors. Consequently, if the same quantization is used for instances with various sizes, the quality of reconstructed components may be inconsistent, for example, a larger instance may have lower reconstruction quality than a smaller instance.

The present principles provide a method and apparatus for efficiently quantizing the transformation information for a 3D instance component by considering rate-distortion performance of a 3D encoder. In one exemplary embodiment, considering the maximum allowed distortion, the quantization parameters for the rotation part and translation part of the instance are determined such that rate-distortion performance is improved. In the following, the number of quantization bits is used as an exemplary quantization parameter. The present principles can be applied when other quantization parameters, such as a quantization step size, are used.

As the scaling part of the transformation may be compressed by a lossless floating point codec, scaling part of the transformation is not involved in the following discussion.

Based on the discovered "pattern-instance" representation, a vertex v of an original instance can be represented by:

$$v = R*p + T, \quad (1)$$

where p is v's corresponding vertex in the corresponding pattern, R and T are the rotation matrix and translation vector between pattern and instance, respectively.

The decoded position of v, $v_d$, can be calculated as:

$$v_d = R_d * p_d + T_d, \quad (2)$$

where $p_d$ is the decoded position of p, and $R_d$ and $T_d$ are the decoded rotation matrix and decoded translation vector, respectively.

The distortion caused by compression for vertex v can then be calculated as:

$$v - v_d = (R*p + T) - (R_d*p_d + T_d) \quad (3)$$
$$= (R*p - R_d*p_d) + (T - T_d)$$
$$= (R*p - R_d*p_d) + \Delta T.$$

Based on mathematical theory, it can be inferred that:

$$\|v - v_d\| = \|(R*p - R_d*p_d) + \Delta T\| \le \|R*p - R_d*p_d\| + \|\Delta T\| = \quad (4)$$
$$\|R*p - R_d*p + R_d*p - R_d*p_d\| + \|\Delta T\| \le$$
$$\|R*p - R_d*p\| + \|R_d*p - R_d*p_d\| + \|\Delta T\| \le$$
$$\|(R - R_d)*p\| + \|p - p_d\| + \|\Delta T\| =$$
$$\|(R - R_d)*p\| + \|\Delta p\| + \|\Delta T\| \le$$
$$\|(R - R_d)*p\| + \|\Delta p\|_{max} + \|\Delta T\|_{max},$$

where $\|\Delta p\|_{max}$ is the upper bound of the quantization error of vertex p, and $\|\Delta T\|_{max}$ is the upper bound of the quantization error of instance translation.

If we assume that the rotation matrix is represented by Eular angles ($\alpha$, $\beta$, $\gamma$), which may be quantized using the same number of quantization bits, then $$\|(R - R_d)*p\| \le \sqrt{3}\Delta\theta_{max}\|p\|, \quad (5)$$

where $\Delta\theta_{max}$ is the upper bound of quantization error for $\alpha$, $\beta$ and $\gamma$. Eq. (5) can be adapted when other representations or different quantization parameters are used for angles ($\alpha$, $\beta$, $\gamma$). Using Eq. (5), Eq. (4) becomes:

$$\|v - v_d\| \le \|\Delta p\|_{max} + \sqrt{3}\Delta\theta_{max}\|p\|_{max} + \|\Delta T\|_{max}, \quad (6)$$

where $\|p\|_{max}$ is the maximum distance between any vertex of the corresponding pattern and the center of the corresponding pattern.

If we denote the number of quantization bits used for encoding patterns as QB_Pattern, and the number of quantization bits for encoding translation as QB_translation, $\|\Delta p\|_{max}$ may be calculated as:

$$\|\Delta p\|_{max} = \frac{Pattern\_Scal}{2^{QB\_Pattern+1}},$$

and $\|\Delta T\|_{max}$ may be calculated as:

$$\|\Delta T\|_{max} = \frac{Translation\_Scal}{2^{QB\_translation+1}},$$

where Pattern_Scal and Translation_Scal are the scales of the bounding box of the pattern vertices and translations, respectively. In one example, Translation_Scal can be measured as the difference between the maximum and minimum possible values of all translations of all instances, and Pattern_Scal can be measured as the diagonal distance of a bounding box containing all patterns. In another example, Pattern_Scal can be measured as the maximum values of x, y, and z dimensions.

One of our targets is to allocate bits while controlling the maximum coding error. Suppose the maximum allowed coding error is MaxErr, Eq. (6) should satisfy the following inequality:

$$\|\Delta p\|_{max} + \sqrt{3}\Delta\theta_{max}\|p\|_{max} + \|\Delta T\|_{max} \le MaxErr. \quad (7)$$

In one embodiment, for simplification, we assume that all patterns use the same number of quantization bits and all instance translations use the same number of quantization bits. Thus, the quantization error for patterns may satisfy $$\|\Delta p\|_{max} = MaxErr/3, \quad (8)$$

and the quantization error for instance translation may satisfy $$\|\Delta T\|_{max} = MaxErr/3. \quad (9)$$

After the upper bounds for quantization errors are estimated in Eqs. (8) and (9), we can estimate the number of quantization bits based on the scale of the bounding box of the pattern vertices and instance translation.

In one simplified exemplary embodiment, we may assume both upper bounds are the same, and thus, according to Eqs. (8) and (9), instance translation may use is the same number of quantization bits as patterns.

In another exemplary embodiment, the scale difference between the bounding box of patterns and the bounding box of instances are considered. Suppose $\|\Delta p\|_{max} = \|\Delta T\|_{max}$, the number of quantization bits for the translation part can be calculated as:

$$\|\Delta p\|_{max} = \quad (10)$$

$$\frac{\text{Pattern\_Scal}}{2^{QB\_translation+1}} = \frac{\text{Translation\_Scal}}{2^{QB\_translation+1}} = \|\Delta T\|_{max} \Rightarrow \frac{2^{QB\_translation}}{2^{QB\_Pattern}} =$$

$$\frac{\text{Translation\_Scal}}{\text{Pattern\_Scal}} \Rightarrow 2^{QB\_translation-QB\_Pattern} =$$

$$\frac{\text{Translation\_Scal}}{\text{Pattern\_Scal}} \Rightarrow QB\_translation - QB\_Pattern =$$

$$\log_2\left(\frac{\text{Translation\_Scal}}{\text{Pattern\_Scal}}\right) \Rightarrow QB\_translation =$$

$$QB\_Pattern + \left\lceil \log_2\left(\frac{\text{Translation\_Scal}}{\text{Pattern\_Scal}}\right)\right\rceil.$$

Parameter_Translation_Scal may be sent in the bitstream and it becomes available at both the encoder and decoder, so that Eq. (10) can be used at both the encoder and decoder. According to Eq. (10), all instance translations use the same quantization parameter, which are related to the ratio between the scale of patterns and instance translations.

As discussed in FIG. 2, the same rotation quantization error (in angular measure) may cause a larger vertex shift in a larger component. Thus, the quantization parameter for the rotation information may be quantized adaptively according to the size of an instance. For example, a finer quantization parameter, such as a larger number of bits or a smaller quantization step size, may be used for quantizing the rotation part of a larger instance.

The vertex coordinate error caused by rotation quantization error may satisfy $$\sqrt{3}\Delta\theta_{max\_i}\|p\|_{max} = \text{MaxErr}/3. \quad (11)$$

That is, the upper bound of rotation quantization error for the $i^{th}$ instance component may be estimated as:

$$\Delta\theta_{max\_i} = \text{MaxErr}/(3\sqrt{3}\|p\|_{max}) = \text{MaxErr}/(3\sqrt{3}*\text{HalfScal}_i) = \|\Delta p\|_{max}/(\sqrt{3}*\text{HalfScal}_i), \quad (12)$$

where HalfScal$_i$ is the half scale (i.e., half of the diagonal distance of the bounding box of the instance) of the $i^{th}$ instance component. In one embodiment, HalfScal$_i$ may be estimated from the corresponding reconstructed pattern. By estimating HalfScal$_i$ using the reconstructed pattern, which can be accessed by both the encoder and decoder, the quantization parameter for the rotation part can be calculated at the decoder, and thus, the encoder need not to explicitly indicate the quantization parameter for the rotation part in the bitstream. $\Delta\theta_{max\_i}$ may be estimated differently from Eq. (12). For example, when a tighter approximation is estimated in Eq. (5), Eq. (12) as well as Eqs. (7) and (11) may be updated accordingly.

Before compression, all the patterns are aligned with the world coordinate system. Then all the patterns may be encoded together using the same quantization parameter. The positions and orientations of the patterns are also encoded and recorded in the bitstream. Using the number of quantization bits for encoding patterns (QB_Pattern), the number of quantization bits for the rotation part of the $i^{th}$ instance (QB_Rot$_i$) may be calculated based on the scale of the bounding box of the pattern vertices and rotation angles as follows:

$$\Delta\theta_{max\_i} = \frac{\text{angle\_Scal}}{2^{QB\_Rot_i+1}} = \frac{\text{Pattern\_Scal}}{\left(\sqrt{3}*\text{HalfScal}_i\right)*2^{QB\_Pattern+1}} = \quad (13)$$

$$\frac{\|\Delta p\|_{max}}{\left(\sqrt{3}*\text{HalfScal}_i\right)} \Rightarrow 2^{QB\_Rot_i-QB\_Pattern} =$$

$$\frac{\sqrt{3}*\text{HalfScal}_i*\text{angle\_Scal}}{\text{Pattern\_Scal}} \Rightarrow QB\_Rot_i$$

$$= QB\_Pattern + \left\lceil \log_2\left(\frac{\sqrt{3}*\text{HalfScal}_i*\text{angle\_Scal}}{\text{Pattern\_Scal}}\right)\right\rceil,$$

where angle_Scal is the scale of the rotation angle. In one example, angle_Scal can be measured as the difference between the maximum and minimum possible angles of all instance rotations. In another example, we set angle_Scal to $2\pi$.

Assuming Pattern_scal is measured as the size of the bounding box of all patterns and the possible value of each Eular angle is $0\sim 2\pi$, Eq. (13) becomes:

$$QB\_Rot_i = QB\_Pattern + \left\lceil \log_2\left(\frac{2\sqrt{3}*\text{HalfScal}_i}{\text{Pattern\_Scal}}\right)\right\rceil. \quad (14)$$

That is, when an instance is larger (i.e., HalfScal$_i$ is larger), the number of quantization bits (QP_Rot$_i$) for the instance is determined to be larger. Thus, according to the present principles, a larger instance gets finer quantization for its rotation part.

Here we suppose there is no scaling part in the transformation in Eq. (14). Eq. (14) should be adjusted accordingly when the scale of the rotation angle changes, the scaling part of the transformation is considered, or the sizes of patterns and instances are measured differently.

As discussed above, quantization parameters for the translation part and rotation part of the transformation matrix of an instance may be determined based on the quantization parameter used for encoding patterns, so as to improve compression efficiency. In one exemplary embodiment, the number of quantization bits used for encoding patterns (QB_Pattern) may be indicated in the bitstream, the translation part of the transformation matrix of the instance may be calculated using Eq. (10), and the number of quantization bits for the rotation part may be calculated using Eq. (14).

In another exemplary embodiment, we assume that the upper bound of the reconstruction error of pattern vertices, instance translation and instance rotation are the same, i.e., $$\|\Delta P\|_{max} = \|\Delta E\|_{max}/3,$$

where $\|\Delta E\|_{max}$ is the upper bound of the quantization error of the entire model, and $\|\Delta P\|_{max}$ is the upper bound of the quantization error for all patterns. Consequently, the number of quantization bits for encoding patterns may be calculated from the number of quantization bits of the entire 3D input model as follows:

$$QB\_Pattern = QB\_EntireModel + \left\lceil \log_2\left(\frac{3*\text{Pattern\_Scal}}{\text{EntireModel\_Scal}}\right)\right\rceil, \quad (15)$$

where QB_EntireModel is the number of quantization bits for the entire 3D input model, and EntireModel_Scal reflects the size of the entire 3D input model.

In the above, Pattern_Scal can be measured using all patterns in the 3D model. In another embodiment, the patterns are compressed separately and the instances of the same pattern are compressed together. All the patterns may use the same quantization parameter. Further, Pattern_Scal in Eqs. (10) and (13) corresponds to the scale of the bounding box of the corresponding pattern, and Translation_Scal in Eq. (10) and angle_Scal in Eq. (13) correspond to the scales of the translations and rotation angles of the instances of the current pattern, respectively.

Figure 3:
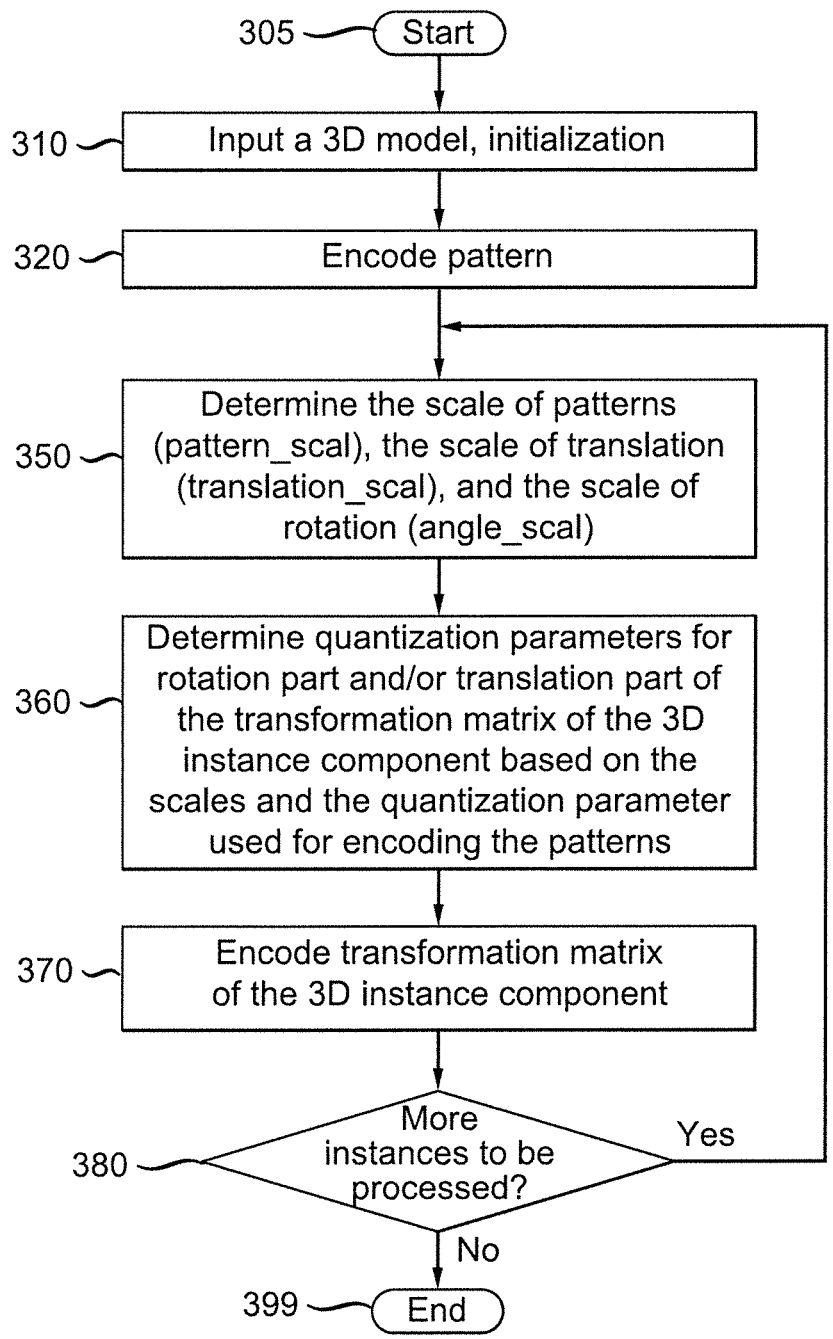
FIG. 3 is a flow diagram depicting an example for encoding patterns and instances of a 3D model, in accordance with an embodiment of the present principles.

FIG. 3 illustrates an exemplary method 300 for encoding patterns and instances of a 3D model. Method 300 starts at step 305. At step 310, 3D model data is input and initialization is performed. Additional data, such as quality parameter, quantization parameters for encoding patterns, may also be input or inferred from the input. In one exemplary embodiment, the initialization step may organize the repetitive structures into patterns and instances and generate transformation matrices for instances. At step 320, patterns are encoded to form reconstructed patterns. At step 350, the scales of patterns, translation, and rotation are determined. For example, the scale of patterns (Pattern_scal) may be measured as a diagonal distance of a bounding box containing all patterns, the scale of translation (Translation_scal) may be obtained from metadata and sent in the bitstream, and the rotation scale (angle_scal) may be determined based on the angular representation, for example, angle_scal is set to $2\pi$ when Eular representation is used.

At step 360, the quantization parameter for the translation part of the transformation matrix for an instance component may be determined, for example, using Eq. (10). The quantization parameters for the rotation part of the transformation matrix may be determined, for example, using Eq. (14). The transformation matrix for the instance is then encoded at step 370. It checks whether more instances need to be processed at step 380. If more instances are to be processed, the control is returned to step 350. Otherwise, the control is passed to the end step 399.

Figure 4:
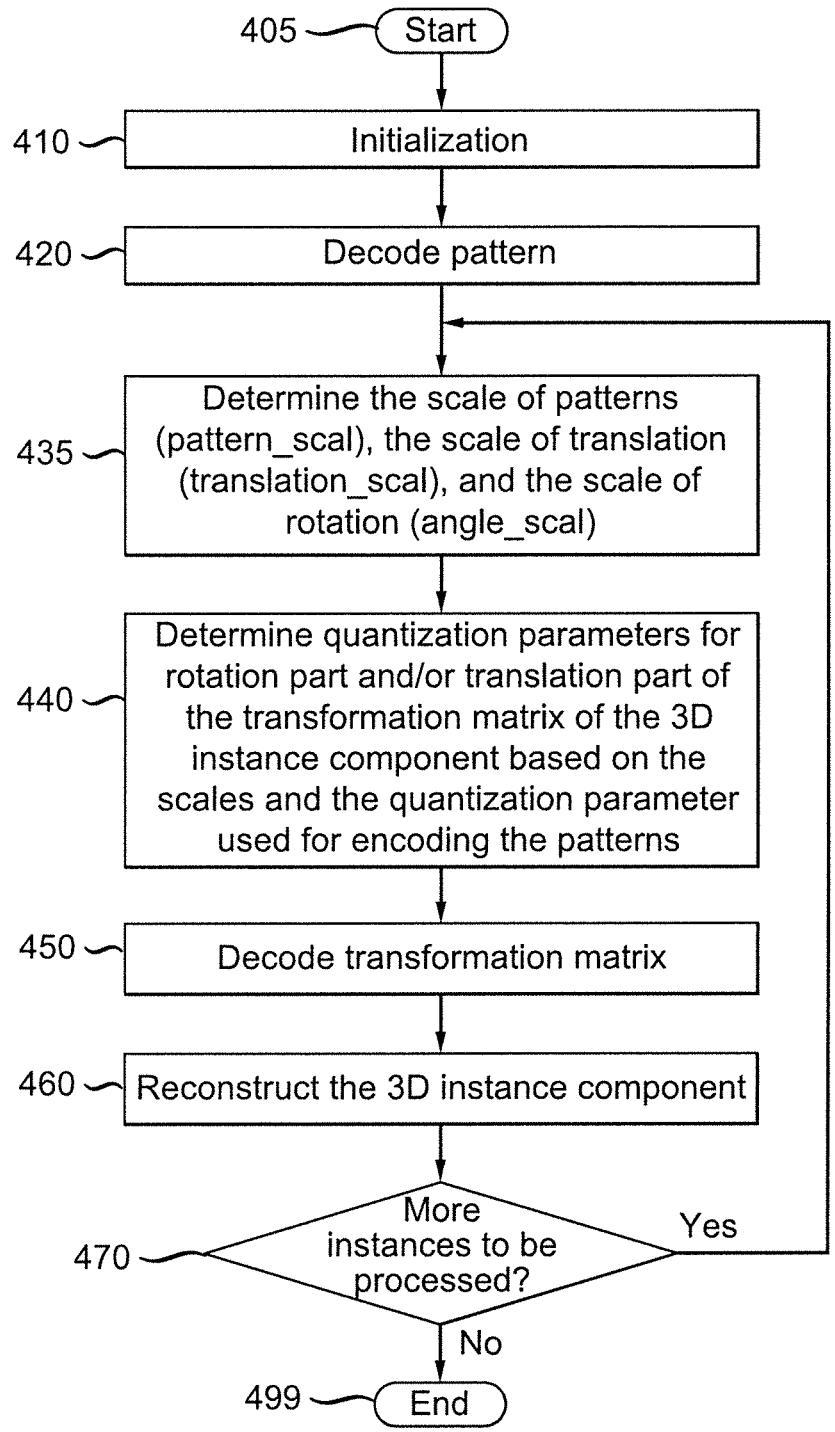
FIG. 4 is a flow diagram depicting an example for decoding patterns and instances of a 3D model, in accordance with an embodiment of the present principles.

FIG. 4 illustrates an exemplary method 400 for decoding patterns and instance of a 3D model. The input of method 400 may include a bitstream, for example, a bitstream generated using method 300. Method 400 starts at step 405. At step 410, initialization is performed, for example, the quantization parameter used for encoding patterns is derived from the input bitstream.

Patterns are decoded at step 420. At step 435, the scales of patterns, translation, and rotation are determined. At step 440, the quantization parameter for the translation part and/or rotation part of the transformation matrix for an instance component may be determined. The transformation matrix is decoded at step 450. The instance is then reconstructed at step 460, for example, using a corresponding reconstructed pattern and decoded transformation matrix. It checks at step 470 whether more instances need to be processed. If yes, the control is returned to step 435. Otherwise, the control is passed to the end step 499.

Note that to properly decode instances, corresponding methods of determining scales for patterns, translation, and rotation, and of calculating quantization parameters should be used at the encoder and decoder. For example, when the bitstream generated by method 300 is used as an input to method 400, steps 435 and 440 should correspond to steps 350 and 360, respectively.

In FIGS. 3 and 4, all patterns in the 3D model are encoded or decoded before instances. In another embodiment, encoding/decoding of each pattern may be followed by encoding/decoding of corresponding instances.

In the above, how to allocate the number of quantization bits are discussed given the maximum allowed error. On the other hand, Eq. (7) can also be used for rate control, that is, for determining the quantization parameters given the number of bits in order to optimize the quality of the decoded 3D model.

The size, measured in the number of bits, of a compressed pattern may be calculated as:

$$\text{Compr\_Pattern} = \text{QB\_Pattern} * \text{Pattern\_Ver\_Num} * C_{pv} + \text{Pattern\_Tri\_Num} * C_{pt}, \quad (16)$$

where Pattern_Ver_Num and Pattern_Tri_Num are the number of vertices and the number of triangles of all patterns, respectively, and Cpv and Cpt are pre-determined values, for example, used to count the compression ratio of entropy encoding. In one implementation, Cpv=0.2 and Cpt=3. The size of compressed instance can be calculated as:

$$\text{Compr\_Insta} = \left( \text{QB\_translation} * 3 + \sum_{i=1}^{InstanceNum} \text{QB\_Rot}_i * 3 \right) * C_{insta}, \quad (17)$$

where $C_{insta}$ is a pre-determined value. The size for compressed unique component can be calculated as:

$$\text{Compr\_UniComp} = \text{QB\_UniComp} * \text{UniComp\_Ver\_Num} * C_{pv} + \text{UniComp\_Tri\_Num} * C_{pr}, \quad (18)$$

where QB_UniComp is the number of quantization bits for encoding the unique components, UniComp_Ver_Num and UniComp_Tri_Num are the number of vertices and the number of triangles of unique components, respectively. In one exemplary embodiment, $\|\Delta U\|_{max} = \|\Delta P\|_{max}$, QB_UniComp may be calculated as follows:

$$\text{QB\_UniComp} = \text{QB\_Pattern} + \left\lceil \log_2\left( \frac{\text{UniComp\_Scal}}{\text{Pattern\_Scal}} \right) \right\rceil, \quad (19)$$

where UniComp_Scale is the scale of the bounding box of the unique parts. The quantization bits for the translations of unique components may be calculated as follows:

$$\text{QB\_UniComp\_Transl} = \text{QB\_Pattern} + \left\lceil \log_2\left( \frac{\text{UniComp\_Transl\_Scal}}{\text{Pattern\_Scal}} \right) \right\rceil,$$

where UniComp_Transl_Scal is the scale of the bounding box of all translations of all unique components.

The total size of the compressed 3D model can then be calculated as:

$$\text{Compr\_EntireModel} = \text{Compr\_Pattern} + \text{Compr\_Insta} + \text{Compr\_UniComp}. \quad (20)$$

Based on Eqs. (10), (14) and (19), QB_Translation, QB_Rot$_i$, or QB_UniComp can be obtained as a function of QB_Pattern. Then according to Eqs. (10), (14), and (16-19), Compr_Pattern, Compr_Insta, or Compr_UniComp can be expressed as a function of QB_Pattern. Further using Eq. (20), the relationship between the total size of the compressed 3D model Compr_EntireModel and QB_Pattern can be obtained. Subsequently, given the expected compressed model size Compr_Model, QB_Pattern may be decided. From QB_Pattern, the upper bound of the coding error MaxErr can be calculated using MaxErr=3*Pattern_Scal/$2^{QB\_Pattern+1}$.

Figure 5:
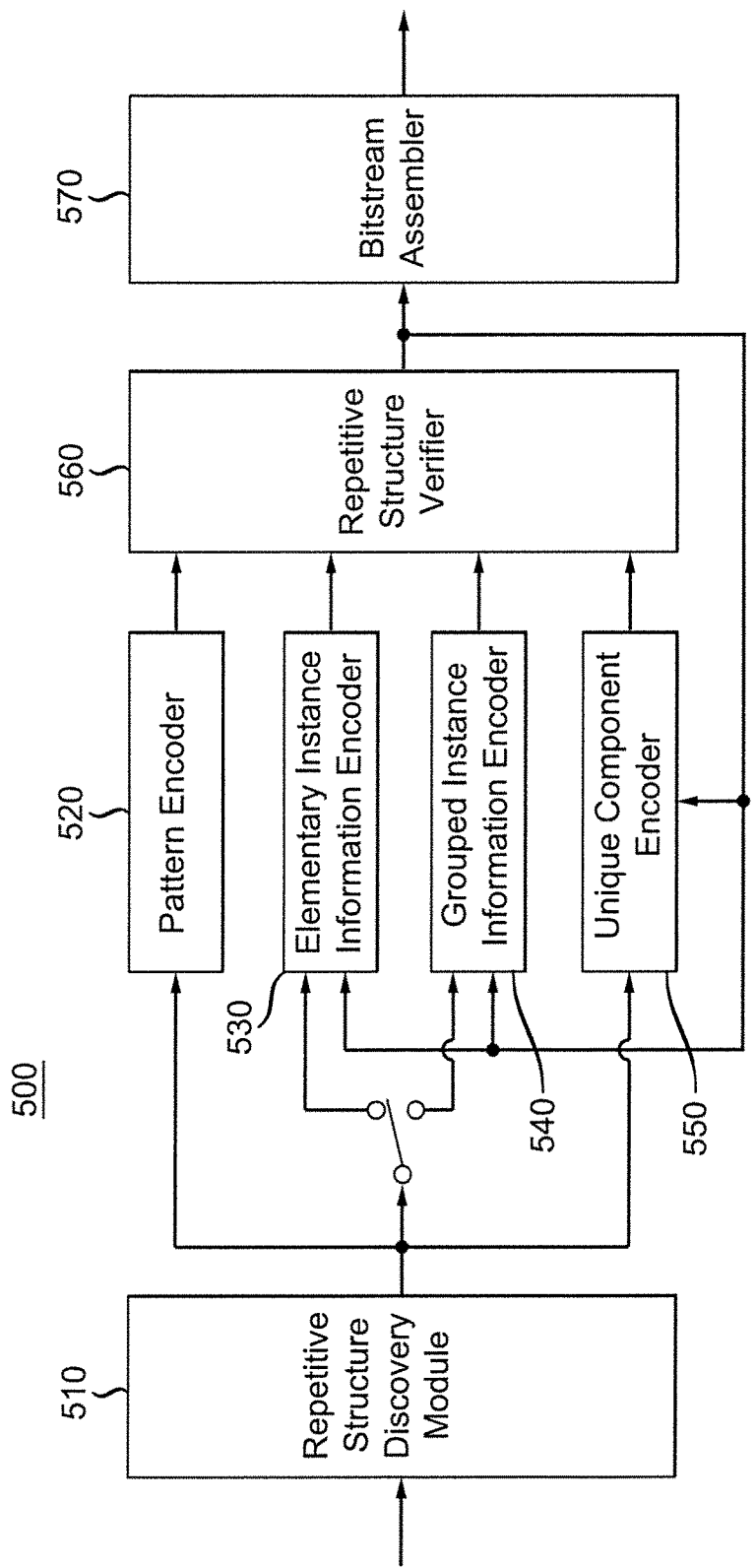
FIG. 5 shows an exemplary encoder of 3D models according to the present principles.

FIG. 5 depicts a block diagram of an exemplary 3D model encoder 500. The input of apparatus 500 may include a 3D model, quality parameter for encoding the 3D model and other metadata. The 3D model first goes through the repetitive structure discovery module 510, which outputs the 3D model in terms of patterns, instances and unique components. A pattern encoder 520 is employed to compress the patterns and a unique component encoder 550 is employed to encode the unique components. For the instances, the instance component information is encoded based on a user-selected mode. If instance information group mode is selected, the instance information is encoded using grouped instance information encoder 540; otherwise, it is encoded using an elementary instance information encoder 530. The encoded components are further verified in the repetitive structure verifier 560. If an encoded component does not meet its quality requirement, it will be encoded using unique component encoder 550. Bitstreams for patterns, instances, and unique components are assembled at bitstream assembler 570.

To improve compression efficiency, all components of the original 3D model may be translated such that the centers of components are aligned. The translations of the centers need to be compressed and indicated in the bitstream. The rate-distortion performance may be improved as the bounding box of the components could be much smaller (in most cases) and less quantization bits are required for the same coding error.

In addition, a pattern may be generated by translating the center of a component to the origin, and the original component may be regarded as an instance. To improve compression efficiency, for pattern components (components corresponding to patterns), only translations are indicated the compressed bitstream. If there are no or not enough repetitive structures to guarantee the bitrate saving from the pattern-instance representation, all components of the input 3D model may be regarded as unique components.

Figure 6:
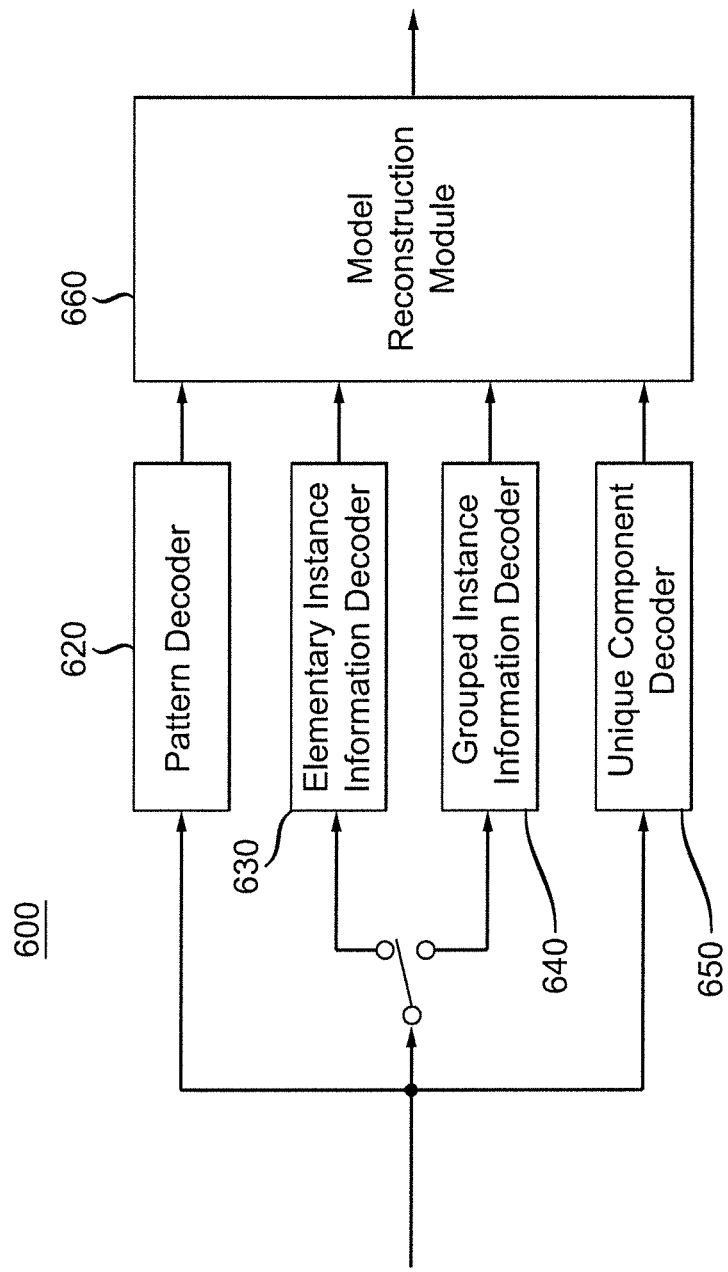
FIG. 6 shows an exemplary decoder of 3D models according to the present principles.

FIG. 6 depicts a block diagram of an exemplary 3D model decoder 600. The input of apparatus 600 may include a bitstream of a 3D model, for example, a bitstream generated by encoder 500. The information related to patterns in the compressed bitstream is decoded by pattern decoder 620. Information related to unique components is decoded by unique component decoder 650. The decoding of the instance information also depends on the user-selected mode. If instance information group mode is selected, the instance information is decoded using a grouped instance information decoder 640; otherwise, it is decoded using an elementary instance information decoder 630. The decoded patterns, instance information and unique components are reconstructed to generate an output 3D model at model reconstruction module 660.

Figure 7:
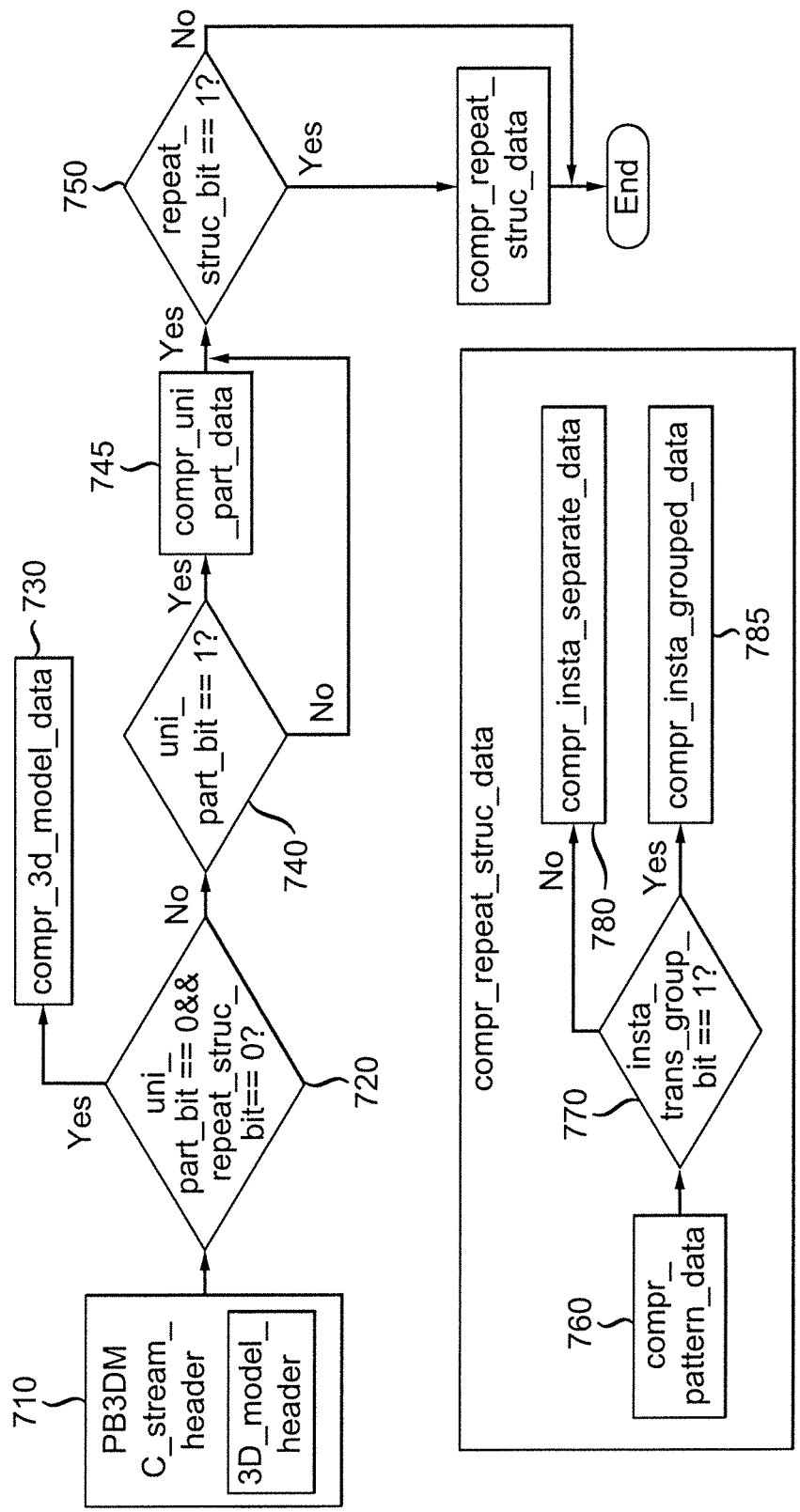
FIG. 7 shows an example depicting bitstream structure, in accordance with an embodiment of the present principles.

FIG. 7 illustrates an exemplary method 700 for generating a compressed bitstream. The bitstream starts with the header buffer (PB3DMC_stream_header, 710), which contains all the necessary information for decoding the compressed stream. The information may include:

whether or not there are unique parts in the original model, whether or not there is at least one repetitive structure in the original model, whether or not the "grouped instance transformation mode" or "elementary instance transformation mode" is used in this bitstream, information about the original 3D model, information about the type of attributes instances may have, the 3D model compression method used for compressing geometry, and connectivity and properties of all 3D objects (patterns and other parts if necessary).

If there is no unique part and repetitive structure in the original model (uni_part_bit==0 && repeat_struc_bit==0), the remaining part of the bitstream is the compressed input 3D model (730) using the 3D model compression method indicated in PB3DMC_stream_header. Otherwise, the next part in the bitstream is the compressed result of all unique components (745) if there are some (740). If there is at least one repetitive structure (750), the next data field is the compressed result of all patterns (760). Depending on which instance transformation packing mode is chosen in the bitstream (770), either compr_insta_grouped_data (780) or compr_insta_elementary_data (785) is the next part in the bitstream.

In TABLE 1, exemplary syntax and semantics for the header are illustrated for the present principles. Note that some data fields are taken from the bitstream definition of 3DMC Extension [w11455, Final text of ISO/IEC 14496-16 4th Edition, MPEG-3DGC, 93th MPEG meeting, 2011-02].

TABLE 1

| class 3d_model_header{ | Num. of Bits | Descriptor |
| --- | --- | --- |
| ver_num | 32 | |
| tri_num | 32 | |
| default_coord_bbox | 1 | |
| If(default_coord_bbox=='0'){ | | |
|     coord_bbox | 6 * 32 | |
| } | | |
| QP_coord | 5 | |
| normal_binding | | |
| if(normal_binding != 'not_found'){ | | |
|     default_normal_bbox | 1 | |
|     QP_normal | 5 | |
| } | | |
| color_binding | | |
| if(color_binding != 'not_found'){ | | |
|     default_color_bbox | 1 | |
|     if(defalut_color_bbox=='0'){ | | |
|         color_bbox | 6 * 32 | |
|     } | | |
|     QB_color | 5 | |
| } | | |
| multi_texCoord_num | 5 | |

TABLE 1-continued

| class 3d_model_header{ | Num. of Bits | Descriptor |
|---|---|---|
|     if (multi_texCoord_num != 0){ | | |
|         for (i=0; i < multi_texCoord_num; i++){ | | |
|             texCoord_binding | | |
|             default_texCoord_bbox | 1 | |
|             if(default_texCoord_bbox=='0'){ | | |
|                 texCoord_bbox | 4 * 32 | |
|             } | | |
|             QB_texCoord | 5 | |
|         } | | |
|     } | | |
|     multi_attribute_num | 5 | |
|     if (multi_attribut_num != 0){ | | |
|         for (i=0; i < multi_attribute_num; i++){ | | |
|             attribute_dim_num | | |
|             attribute_binding | | |
|             default_attribute_bbox | 1 | |
|             if(default_attribute_bbox=='0'){ | | |
|                 attribute_bbox | 2 * attribute_dim_num * 32 | |
|             } | | |
|             QB_attribute | 5 | |
|         } | | |
|     } | | |
| } | | | ver_num: This 32-bit unsigned integer contains the number of vertices of the entire 3D model. This value can be used to verify the decoded 3D model.

tri_num: This 32-bit unsigned integer contains the number of triangles of the entire 3D model. This value can be used to verify the decoded 3D model.

default_coord_bbox: This 1-bit unsigned integer indicates whether a default bounding box is used for the entire 3D model's geometry. 0 means using another bounding box and 1 means using the default bounding box. The default bounding box is defined as $x_{min}=0.0$, $y_{min}=0.0$, $z_{min}=0.0$, $x_{max}=1.0$, $y_{max}=1.0$, and $z_{max}=1.0$.

coord_bbox: This data field contains the bounding box of the entire 3D model's geometry. The geometry bounding box is defined by $(x_{min}, y_{min}, z_{min}, x_{max}, y_{max}, z_{max})$ QP_coord: This 5-bit unsigned integer indicates the quality parameter of the 3D model geometry. The minimum value of QP_coord is 3 and maximum is 31. QP_coord may correspond to QB_Pattern in Eq. (10) or QB_EntireModel in Eq. (15).

normal_binding: This 2-bit unsigned integer indicates the binding of normals to the 3D model. The admissible values are described in the following table.

| normal_binding | Binding |
|---|---|
| 0 | not_bound |
| 1 | bound_per_vertex |
| 2 | bound_per_face |
| 3 | bound_per_corner | default_normal_bbox: This 1-bit unsigned integer should always be '0', which indicates that a default bounding box is used for the normal of the entire 3D model. The default bounding box of normal is defined as $nx_{min}=0.0$, $ny_{min}=0.0$, $nz_{min}=0.0$, $nx_{max}=1.0$, $ny_{max}=1.0$, and $nz_{max}=1.0$.

QP_normal: This 5-bit unsigned integer indicates the quality parameter of the 3D model geometry. The minimum value of QP_normal is 3 and maximum is 31.

color_binding: This 2-bit unsigned integer indicates the binding of colors to the 3D model. The following table shows the admissible values.

| color_binding | Binding |
|---|---|
| 0 | not_bound |
| 1 | bound_per_vertex |
| 2 | bound_per_face |
| 3 | bound_per_corner | default_color_bbox: This 1-bit unsigned integer indicates whether a default bounding box is used for the color of the entire 3D model. 0 means using another bounding box and 1 means using the default bounding box. The default bounding box is defined as $r_{min}=0.0$, $g_{min}=0.0$, $b_{min}=0.0$, $r_{max}=1.0$, $g_{max}=1.0$, and $b_{max}=1.0$.

color_bbox: This data field contains the bounding box of the color of the entire 3D model. The color bounding box is defined by $(r_{min}, g_{min}, b_{min}, r_{max}, g_{max}, b_{max})$ QP_color: This 5-bit unsigned integer indicates the quality parameter of the color. The minimum value of QP_color is 3 and maximum is 31.

multi_texCoord_num: This 5-bit unsigned integer gives the number of texture coordinates per vertex/corner.

texCoord_binding: This 2-bit unsigned integer indicates the binding of texture coordinates to the 3D model. The following table shows the admissible values.

| texCoord_binding | Binding |
|---|---|
| 0 | forbidden |
| 1 | bound_per_vertex |
| 2 | forbidden |
| 3 | bound_per_corner | default_texCoord_bbox: This 1-bit unsigned integer indicates whether a default bounding box is used for the texture coordinates. 0 means using another bounding box and 1 means using the default bounding box. The default bounding box is defined as $u_{min}=0.0$, $v_{min}=0.0$, $u_{max}=1.0$, and $v_{max}=1.0$.

texCoord_bbox: This data field contains the bounding box of the texture coordinate of the entire 3D model. The texture coordinate bounding box is defined by ($u_{min}$, $v_{min}$, $u_{max}$, $v_{max}$).

QP_texCoord: This 5-bit unsigned integer indicates the quality parameter of texture coordinates. The minimum value of QP_texCoord is 3 and maximum is 31.

multi_attribute_num: This 5-bit unsigned integer indicates the number of attributes per vertex/face/corner.

attribute_binding: This 2-bit unsigned integer indicates the binding of attributes to the 3D model. The following table shows the admissible values.

| attribute_binding | Binding |
|---|---|
| 0 | forbidden |
| 1 | bound_per_vertex |
| 2 | bound_per_face |
| 3 | bound_per_corner | default_attribute_bbox: This 1-bit unsigned integer indicates whether a default bounding box is used for the attributes. 0 means using another bounding box and 1 means using the default bounding box. The default bounding box is defined as attribute_min[1 . . . attribute_dim]=0.0, attribute_max[1 . . . attribute_dim]=1.0.

attribute_bbox: This data field contains the bounding box of the attribute. The texture coordinate bounding box is defined by (attribute_min[1 . . . attribute_dim], attribute_max[1 . . . attribute_dim]).

QP_attribute: This 5-bit unsigned integer indicates the quality parameter of the attribute. The minimum value of QP_attribute is 3 and maximum is 31.

In TABLE 2, exemplary syntax and semantics for unique parts are illustrated for the present principles.

TABLE 2

| class compr_uni_part_data{ | Num. of bits | Descriptor |
|---|---|---|
| compr_uni_comp_data | | |
| compr_uni_comp_transl | bit_num_uni_comp_transl( ) | f(bit_num_uni_comp_transl( )) |
| } | | | compr_uni_comp_data: This data field contains the compressed geometry, connectivity and properties of all unique components, which is encoded by the compression method indicated by 3d_model_compr_mode. All unique components are translated to the origin before compression.

compr_uni_comp_transl: This data field contains the compressed translation vectors for all unique components. The unique component translation vectors are compressed by first quantization and then entropy coding. This data field use the same order of unique component with compr_uni_comp_data.

bit_num_uni_comp_transl( ): This function computes the number of bits used for quantizing each unique component translation vector based on QP_coord.

In TABLE 3, exemplary syntax and semantics for repetitive structures are illustrated for the present principles.

TABLE 3

| class compr_repeat_struc_data{ | Num. of bits | Descriptor |
|---|---|---|
| compr_pattern_data | | |
| compr_pattern_transl | bit_num_pattern_transl( ) | f(bit_num_pattern_transl( )) |
| if(insta_trans_elem_bit == 1){ | | |
|    compr_insta_elementary_data | | |
| } | | |
| else{ | | |
|    compr_insta_grouped_data | | |
| } | | |
| } | | | compr_pattern_data: This data field contains the compressed geometry, connectivity and properties of all patterns, which is encoded by the compression method indicated by 3d_model_compr_mode.

compr_pattern_transl: This data field contains the compressed translation vectors for all pattern components. The pattern translation vectors are compressed by first quantization and then entropy coding. This data field uses the same order of patterns with compr_pattern_data.

compr_insta_elementary_data: This data field contains the compressed transformation data for all instances using the "elementary instance transformation mode". It is compressed in a manner that is byte aligned.

compr_insta_grouped_data: This data field contains the compressed transformation data for all instances using the "grouped instance transformation mode". It is compressed in a manner that is byte aligned.

bit_num_pattern_transl( ): This function computes the number of bits used for quantizing translation vector of each pattern component based on QP_coord.

In TABLE 4, exemplary syntax and semantics for instances are illustrated for the present principles.

triangle normals are in the opposite direction of the corresponding pattern triangles. 0 means $i^{th}$ instance is not flipped and 1 $i^{th}$ instance is flipped.

elem_insta_reflection_flag: This 1-bit unsigned integer indicates whether the transformation of $i^{th}$ instance includes reflection. 0 means the transformation of $i^{th}$ instance doesn't include reflection and 1 means the transformation of $i^{th}$ instance includes reflection.

elem_insta_attribute_header: This data field contains the attribute header of $i^{th}$ instance.

compr_elem_insta_transl: This data field contains the compressed translation vector of $i^{th}$ instance.

compr_elem_insta_rotat_spherical: This data field contains the compressed rotation transformation of $i^{th}$ instance in spherical mode.

compr_elem_insta_scaling: This data field contains the compressed scaling factor of $i^{th}$ instance.

compr_elem_insta_error_compen_data: This data field contains the compressed coding error compensation data of $i^{th}$ instance.

compr_elem_insta_attribute_data: This data field contains the compressed attribute data of $i^{th}$ instance.

TABLE 4

| class compr_insta_elementary_data{ | Num. of bits | Descriptor |
|---|---|---|
| insta_transl_bbox | 6 * 32 | |
| for (i = 0; i < numofInstance; i ++) { | | |
|     compr_elem_insta_patternID | | ec(v) |
|     elem_insta_flip_flag | 1 | |
|     elem_insta_reflection_flag | 1 | |
|     elem_insta_attribute_header | | |
|     compr_elem_insta_transl | bit_num_insta_transl( ) | f(bit_num_insta_transl( )) |
|     compr_elem_insta_rotat_spherical | | |
|     if (use_scaling_bit){ | | |
|         compr_elem_insta_scaling | | ec(v) |
|     } | | |
|     if (need_error_compensation( )){ | | |
|     compr_elem_insta_error_compen_data | bit_num_vertex_coding_error( ) | f(bit_num_vertex_coding_error( )) |
|     } | | |
|     compr_elem_insta_attribute_data | | |
| } | | |
| } | | | insta_transl_bbox: This data field contains the bounding box of all translation vectors so that quantization can be used when compressing instance translation information. The bounding box is defined by insta_transl_$x_{min}$, insta_transl_$y_{min}$, insta_transl_$z_{min}$, insta_transl_$x_{max}$, insta_transl_$y_{max}$, insta_transl_$z_{max}$.

compr_elem_insta_patternID: This data field contains the compressed pattern ID of $i^{th}$ instance.

elem_insta_flip_flag: This 1-bit unsigned integer indicates whether or not the $i^{th}$ instance is flipped compared with the corresponding pattern. A flipped instance means the instance bit_num_insta_transl( ): This function computes the number of bits used for quantizing instance translation vectors based on QP_coord.

need_error_compensation( ): This function decides whether the coding error of $i^{th}$ instance needs to be compensated.

bit_num_vertex_coding_error( ): This function adaptively computes the number of bits used for quantizing the coding error of each vertex of $i^{th}$ instance based on QP_coord.

In TABLE 5, exemplary syntax and semantics for rotation angles are illustrated for the present principles. The rotation of the $i^{th}$ instance in a spherical mode is represented by three angles: alpha, beta and gamma.

TABLE 5

| class compr_elem_insta_rotat_spherical{ | Num. of bits | Descriptor |
|---|---|---|
|     compr_elem_insta_rotat_alpha | bit_num_rotat_alpha( ) | f(bit_num_rotat_alpha( )) |
|     compr_elem_insta_rotat_beta | bit_num_rotat_beta( ) | f(bit_num_rotat_beta( )) |
|     compr_elem_insta_rotat_gamma | bit_num_rotat_gamma( ) | f(bit_num_rotat_gamma( )) |
| } | | | compr_elem_insta_rotat_alpha: This data field contains the compressed alpha of $i^{th}$ instance's rotation.
compr_elem_insta_rotat_beta: This data field contains the compressed beta of $i^{th}$ instance's rotation.
compr_elem_insta_rotat_gamma: This data field contains the compressed gamma of $i^{th}$ instance's rotation.
bit_num_rotat_alpha( ): This function adaptively computes the number of bits for the alpha value of $i^{th}$ instance's rotation based on QP_coord and the scale of the corresponding pattern.
bit_num_rotat_beta( ): This function computes the number of bits for the beta value of $i^{th}$ instance's rotation based on QP_coord and the scale of the corresponding pattern.
bit_num_rotat_gamma( ): This function computes the number of bits for the gamma value of $i^{th}$ instance's rotation based on QP_coord and the scale of the corresponding pattern.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for generating or decoding a bitstream representing a 3D model, comprising the steps of:
    accessing a first quantization parameter used for encoding a pattern of a repetitive structure associated with the 3D model;
    determining a scale of an instance of the pattern and a scale of the pattern, the instance being represented as a transformation of the pattern;
    determining a rotation scale of the instance;
    determining a second quantization parameter based on the first quantization parameter, the scale of the instance, the rotation scale of the instance, and the scale of the pattern; and
    performing encoding or decoding of said transformation for the instance based on the second quantization parameter.

2. The method of claim 1, further comprising:
    determining a translation scale of the instance; and
    determining a third quantization parameter for the translation part of the transformation based onto the first quantization parameter, the scale of the pattern and the translation scale of the instance.

3. The method of claim 2, wherein the third quantization parameter for the translation part is determined responsive to a ratio between the scale of the translation part and the scale of the pattern.

4. An apparatus for generating or decoding a bitstream representing a 3D model, comprising:
    a processor configured to
        access a first quantization parameter used for encoding a pattern of a repetitive structure associated with the 3D model;
        determine a scale of an instance of the pattern and a scale of the pattern, the instance being represented as a transformation of the pattern;
        determine a rotation scale of the instance;
        determine a second quantization parameter based on the first quantization parameter, the scale of the instance, the rotation scale of the instance, and the scale of the pattern; and
        perform encoding or decoding of said transformation for the instance based on the second quantization parameter.

5. The apparatus of claim 4, wherein the processor is further configured to:
   determine a translation scale of the instance; and
   determining a third quantization parameter for the translation part of the transformation based onto the first quantization parameter, the scale of the pattern and the translation scale of the instance.

6. The apparatus of claim 5, wherein the third quantization parameter for the translation part is determined responsive to a ratio between the scale of the translation part and the scale of the pattern.

\* \* \* \* \*